Feb. 22, 1955 W. W. DAVIS ET AL 2,702,496
DEVELOPED SURFACE TERRAIN MODEL CUTTING MACHINE
Filed Oct. 25, 1951 5 Sheets-Sheet 3
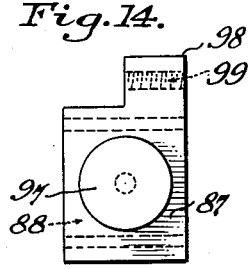
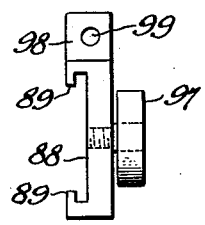
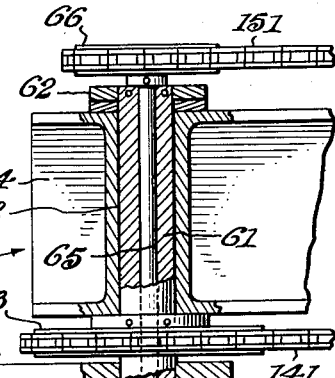
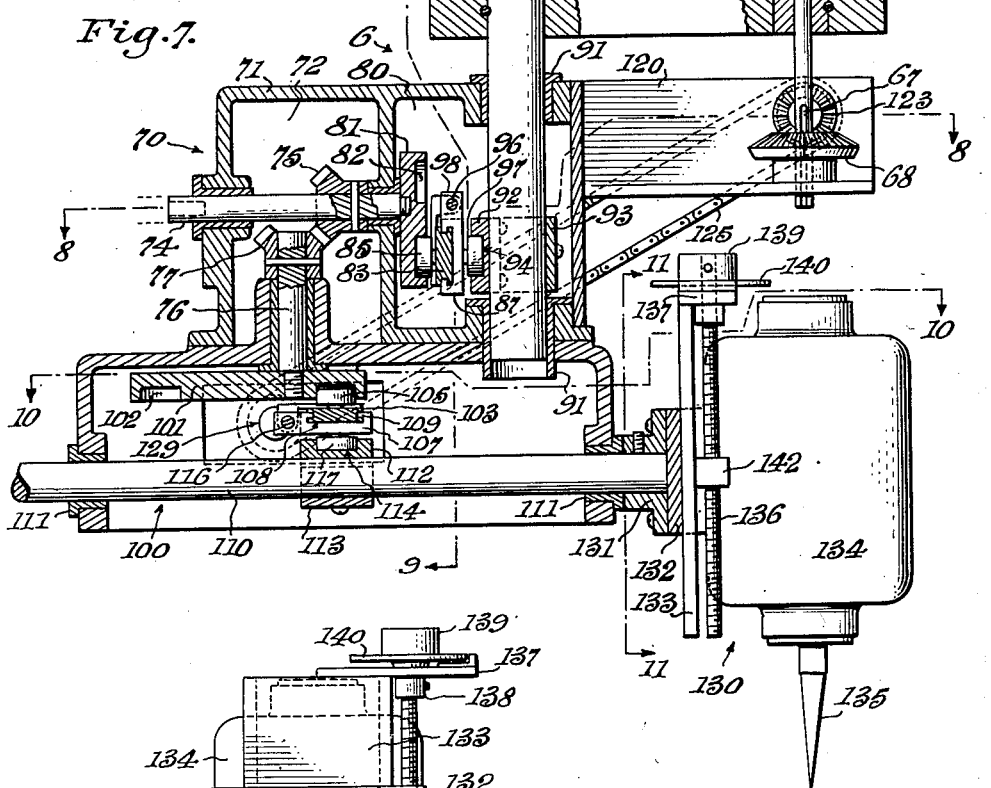
INVENTORS
WILFRED W. DAVIS
JOHN E. DONLON
BY
ATTORNEYS

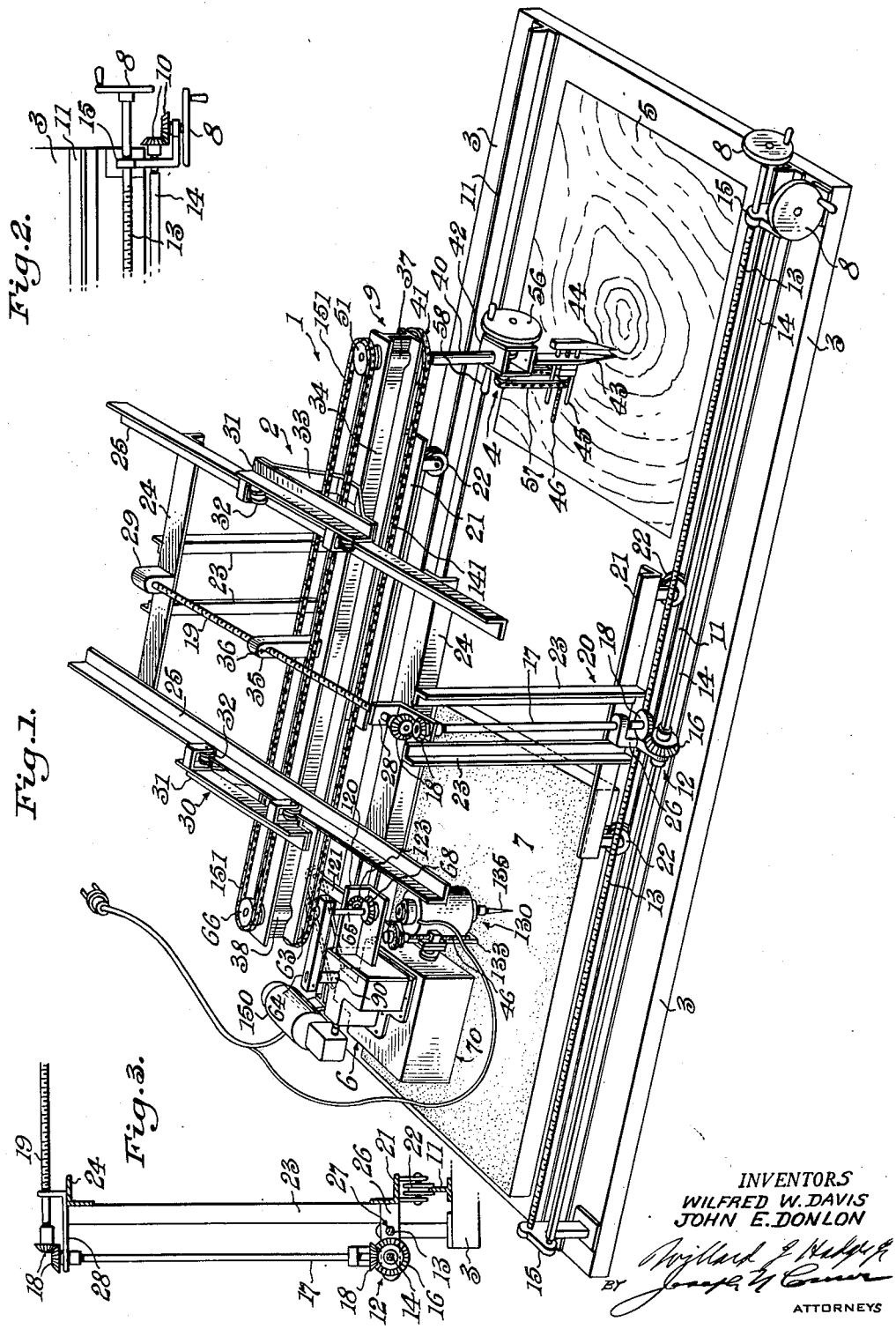

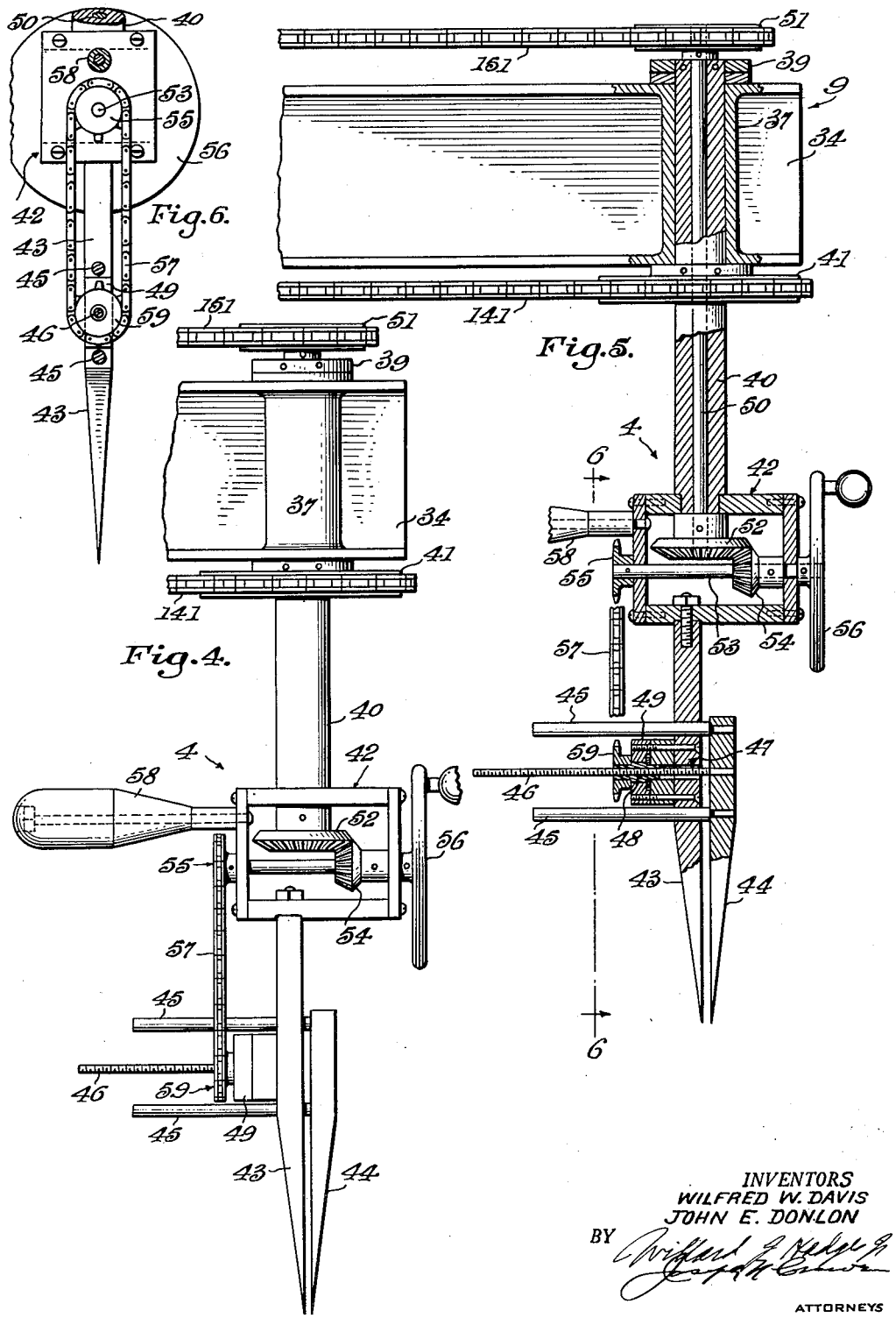

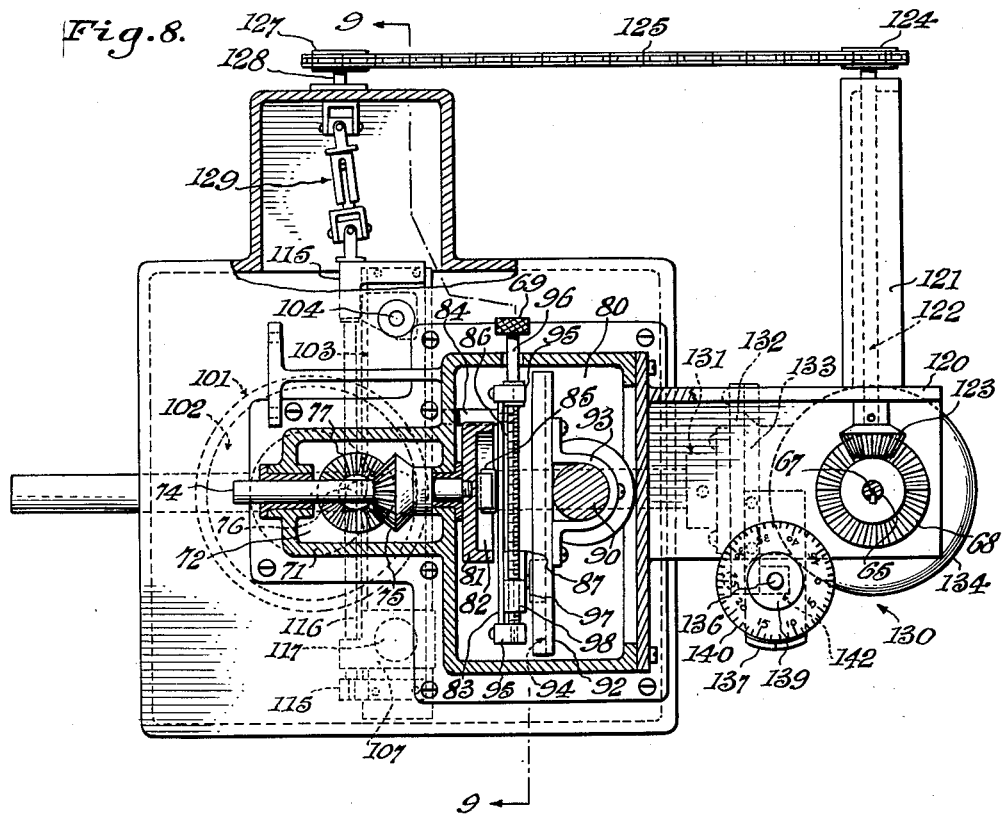
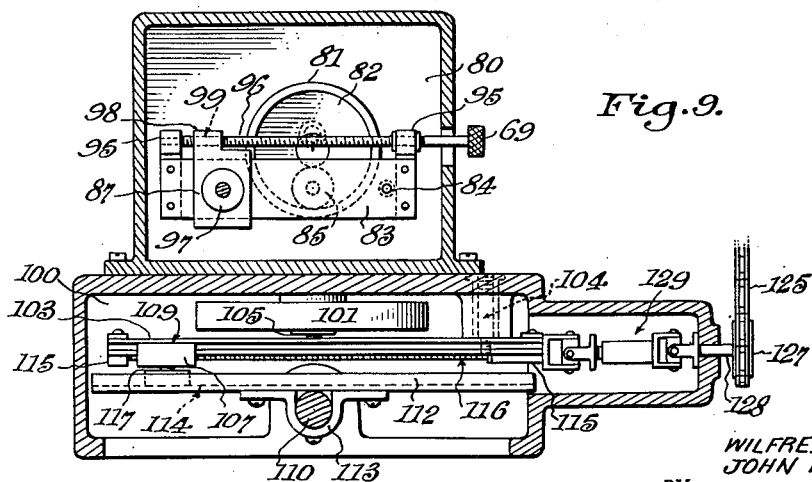

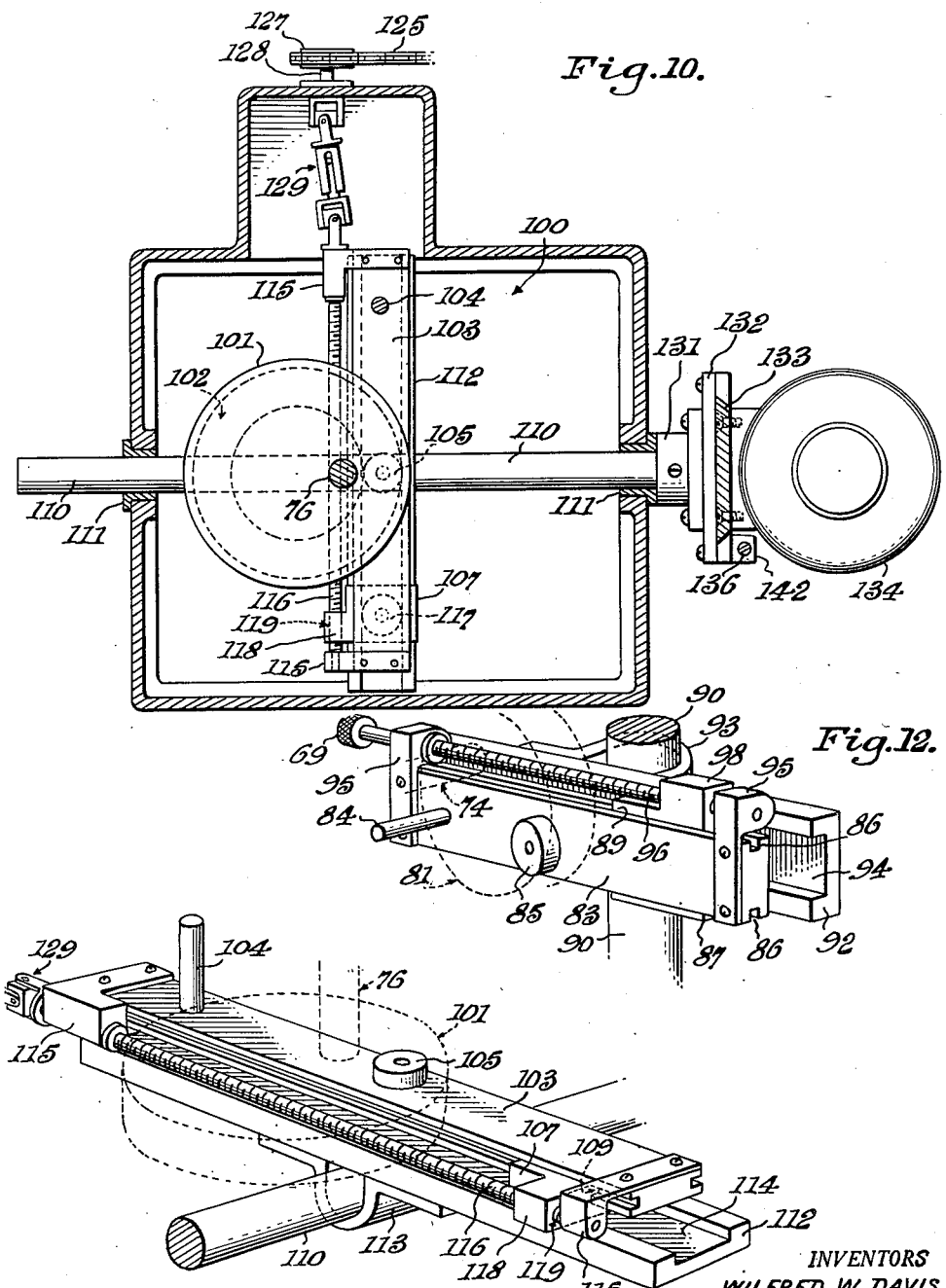

2,702,496

United States Patent Office

Patented Feb. 22, 1955

2,702,496

DEVELOPED SURFACE TERRAIN MODEL CUTTING MACHINE

Wilfred W. Davis, Lorton, and John E. Donlon, Roseville, Va.

Application October 25, 1951, Serial No. 253,184

23 Claims. (Cl. 90—13.1)

(Granted under Title 35, U. S. Code (1952), sec. 266)

The invention described herein may be manufactured and used by or for the Government for governmental purposes, without payment to us of any royalty thereon.

The present invention relates to an improved method of cutting a developed surface model such as a terrain model from information derived from a planar contoured pattern such as a contoured map and an improved machine for directly cutting a developed surface terrain model or other solid object using a planar pattern such as a contoured map.

Prior methods for constructing terrain models have necessitated the separate steps of cutting a stepped model and the subsequent filling in of recesses in the stepped model or the trimming away of excesses so as to present a developed surface. Most machines formerly used for constructing a terrain model from information provided on a planar map are primarily of the type that cut or engrave each contour line to the desired level, leaving a stepped contour model to be completed by hand operations. Prior efforts toward cutting a developed surface appear to have been limited to the use of a shaped bit as an addition to the aforementioned planar cutting instrument that will cut a developed surface adjacent to the contour line being cut by virtue of the configuration of the side of the cutting bit. This arrangement necessitates the selection of a drill of peculiar shape for each particular shape of developed surface, depending on the slope and configuration of the particular surface to be cut.

An important object of this invention is to provide one complete machine that may be used to cut a developed surface terrain model from a solid block of material in response to the tracing of the contour lines on a planar map.

Another object of this invention is to provide a single machine that will cut a developed surface model in one continuous operation from the data provided on a planar pattern.

Another object of this invention is to provide an apparatus that will mill or carve a three-dimensional object from a planar pattern.

Another object of this invention is to provide a routing or cutting assembly for a model cutting machine that will translate the horizontal and vertical components of slopes into the resultant of those two components or the hypotenuse of a right triangle having those components as legs.

Another object of this invention is to provide a twin point stylus assembly for a developed surface terrain model cutting machine that may be used to simultaneously trace adjacent contours on a planar map and to translate the distance between those contours into a mechanical movement.

Another object of this invention is to provide a control mechanism for an apparatus such as a developed surface terrain model cutting machine having a twin point stylus for simultaneously tracing adjacent contours and a power-driven reciprocating cutter that will cause the cutter to operate responsively to movements of and conditions sensed by the stylus.

Still another object of this invention is to provide a continuous method for the construction of a developed surface model that will directly produce the developed surface of a model without necessitating the filling of recesses unnecessarily cut or the trimming to remove excesses that could not be removed on the original cutting.

Other objects and advantages of the invention will be apparent as the description proceeds and the features of novelty will be pointed out in particularity in the appended claims.

Briefly, in accordance with this invention, there is provided an apparatus for cutting a three-dimensional model from a planar pattern having a compound stylus and a power-driven router interconnected for simultaneous parallel and equal motion in a plane parallel to the platform on which the machine rests. The compound stylus senses the direction and distance between corresponding points on adjacent contour lines of the map or other pattern traced by means of twin pointers. A control mechanism conveys this sensing of direction and distance to the router. The router cuts an inclined surface, developed one line at a time, which surface is a replica of the surface represented by the pattern because the router includes a mechanism for reciprocating or oscillating the cutting bit simultaneously both parallel to and normal to the plane on which the machine rests. The amplitude of reciprocation in each direction is independently adjustable, the reciprocation parallel to the base plane being adjusted automatically by the control mechanism both as to direction and amplitude to correspond to the points indicated by the twin pointers of the compound stylus.

There is also disclosed a method of cutting a developed surface model from information incorporated in a contoured pattern. This method contemplates the locating of a point in the block from which the model is to be carved corresponding to a point selected on a contour line of the pattern and cutting an inclined line from that point in the block that is the replica therein of the line from the selected point on the pattern to another point on the pattern that is the nearest point on a next adjacent contour.

In the accompanying drawings, forming a part of this specification, and wherein like numerals are employed to designate like parts throughout the same:

Fig. 1 is a perspective view of an exemplary embodiment of the invention including the pattern and the blank from which the model is cut;

Fig. 2 is a partial plan view showing details of the carriage driving mechanism;

Fig. 3 is a partial elevation showing details of the carriage driving mechanism;

Fig. 4 is a front elevation of the stylus assembly of the machine shown in Fig. 1;

Fig. 5 is a central vertical section of the stylus assembly shown in Fig. 4;

Fig. 6 is a side elevation of that portion of the stylus assembly indicated by the line 6—6 of Fig. 5;

Fig. 7 is a central vertical section of the router assembly with parts shown in elevation;

Fig. 8 is a horizontal section of the router assembly taken substantially on the line 8—8 of Fig. 7;

Fig. 9 is a central vertical section of the router assembly taken substantially on the line 9—9 of Figs. 7 and 8;

Fig. 10 is a horizontal section of the router assembly taken substantially on the line 10—10 of Fig. 7;

Fig. 11 is a side elevation of the cutter and cutter adjusting mechanism of the router as indicated by the line 11—11 of Fig. 7;

Fig. 12 is a perspective view of the motion converter and the amplitude adjusting mechanism of the vertical oscillating mechanism of the router assembly;

Fig. 13 is a perspective view of the motion converter and the amplitude adjusting mechanism of the horizontal oscillating mechanism of the router assembly;

Fig. 14 is a detailed side elevation of the sliding block connector identical to the motion-converting mechanism shown in Figs. 12 and 13; and Fig. 15 is a detailed end elevation of the sliding block connector shown in Fig. 14.

In the drawings, wherein for the purpose of illustration, there is shown a preferred embodiment of the invention, the developed surface model cutting machine or apparatus for milling a developed surface model is indicated by the numeral 1 and is shown in its entirety in Fig. 1. This machine, which is designed to cut a three-dimensional developed surface model using a planar pattern, rests on a platform 3 and includes a stylus assembly 4 for tracing the details of the pattern such as the contoured map 5 as shown in Fig. 1, a cutting or router mechanism 6 which cuts the three-dimensional model from a blank such as the block 7 of any material capable of retaining a cut or molded shape, as for example metal, wood or plastic, either synthetic or natural, and a parallel motion mechanism 2 which serves the purpose of moving the router assembly from an initial point correspondingly as the stylus assembly is moved from an initial point.

I. PARALLEL MOTION MECHANISM

In order that the stylus and router assemblies be moved correspondingly with relation to the initial points of each, it is necessary that the distance between the two remain constant and that the distance between the two units is always along parallel lines. Necessarily, each movement of one of the assemblies must be accompanied by a like movement of the other. To effect this result, the parallel motion mechanism includes parallel rails 11 extending longitudinally of the base or platform 3, a lower carriage 20, an upper carriage 30 and carriage propelling mechanism 12.

The lower carriage 20 is an open framework structure including trucks 21 mounted on wheels 22 which are grooved about their periphery so as to run on the parallel longitudinal rails 11, vertical supports 23 extending upwardly from the trucks 21, stringers 24 each interconnecting the tops of the two vertical supports 23 of a single truck 21, and parallel lateral or transverse rails 25 supported on stringers 24 and normal to the rails 11 in a plane parallel to rails 11. One truck 21 carries a propulsion block 26, having a threaded bore 27, centered on the exterior surface and extending therefrom. Bracket 28 is attached to one stringer 24 directly above the block 26.

The upper carriage 30 is an open work trolley including trucks 31 carrying wheels 32 grooved about their periphery and running on parallel lateral rails 25, slings 33 depending from the trucks 31 and I-beam 34 depending from the slings 33 and extending parallel to the parallel longitudinal rails 11. The I-beam 34 is provided with a centrally located upstanding block 35 having a threaded hole 36 therethrough and bearings 37 and 38, one adjacent each end, the purpose of which will be more fully described later.

The carriage propelling mechanism 12 includes threaded shaft 13 and square shaft 14 journalled in pillow blocks 15 and extending the length of the platform 3 parallel to the rails 11. Threaded shaft 13 passes through the threaded aperture 27 in the propulsion block 26. The square shaft 14 carries gear 16 keyed thereon and having a projection journalled in the propulsion block 26. Shaft 17 extends parallel to vertical supports 23 and is journalled in both the propulsion block 26 and the bracket 28 and has a gear 18 affixed to each extremity thereof, one gear 18 at the lower end of the shaft 17 being meshed with the gear 16. The lateral threaded shaft 19 extending parallel to the parallel lateral rails 25 is journalled in bracket 28 and bearing 29 and passes through the threaded hole 36 in the propulsion block 35 of the beam 34. The lateral threaded shaft 19 carries a gear 18 at one end thereof meshed with the gear 18 attached to the vertical shaft 17 as shown in detail in Fig. 3. Each of the shafts 13 and 14 are provided with a hand wheel 8 for the rotation thereof, the hand wheel of shaft 14 being connected thereto by gears 10 shown in detail in Fig. 2.

This structure maintains the stylus and router assemblies at a predetermined distance from each other and joins them positively for simultaneous and identical movement because beam 34 determines the distance between the two and is limited in movement by the carriages to positions in one plane and parallel to its original position. Other equivalent systems, too numerous for complete discussion, may be devised for the limiting of the beam to positions in a single plane parallel to an original position.

II. STYLUS ASSEMBLY

The map data from which the model is to be made is sensed and converted to mechanical movement for translation to the router by the compound stylus or stylus assembly 4, shown in detail in Figs. 4, 5 and 6, which includes a vertical stylus spindle 40 normal to the beam 34 journalled in bearing 37 at its upper end and held in position by means of retainer 39 locked to the upper end of the spindle and resting on the upper surface of the beam 34 and the lower stylus sprocket 41 locked to the stylus spindle 40 bearing against the lower surface of the beam 34. Gear-box 42 is locked to the lower end of the stylus spindle 40 for rotation therewith. The first style or pointer 43 is attached to gear-box 42 at the side opposite from the stylus spindle 40 and substantially in prolongation of the stylus spindle 40. The first pointer 43 tapers to a point at its end opposite the end at which it is attached to the gear-box 42 in such a manner that the point is aligned with the axis of the spindle 40 about which the spindle rotates so that rotation of the stylus about its axis will rotate pointer 43 but will not move it from the point on the map on which it rests. The second style or pointer 44 which is parallel to pointer 43 and coterminus therewith at its pointed end is attached to and adjustably spaced from pointer 43 by a spacing mechanism including guide bars 45 affixed to the pointer 44, journalled in, and extended through the pointer 43. The spacing mechanism also includes a spacing screw 46 having one end locked in pointer 44 and extending through aperture 47 in pointer 43. Spacing nut 48 is threaded on the spacing screw 46, is maintained relative to pointer 43 by bearing 49 and screws not numbered, and carries spacing nut sprocket 59 which is coaxial with the spacing nut 48 and the spacing screw 46. The stylus spindle shaft 50 is journalled coaxially in the stylus spindle 40 and extends slightly beyond each end of spindle 40. The upper stylus sprocket 51 is locked to that portion of shaft 50 extending above the retainer 39. Gear 52 located inside the gear-box 42 is locked to that portion of the shaft 50 extending beyond the lower end of the stylus spindle 40. Gear-box 42 has journalled therethrough a shaft 53 which is spaced from and is normal to the shaft 50. The shaft 53 carries a pinion 54 locked thereon inside of the gear-box 42 meshed with the gear 52, gear-box sprocket 55 locked thereon exteriorly of the gear-box and aligned with the spacing nut sprocket 49, and hand-wheel 56 locked thereon exteriorly of the gear-box at the end opposite from the end carrying sprocket 55. The pointer spacing chain 57 interconnects the gear-box sprocket 55 and the spacing nut sprocket 59. Operation of the hand wheel 56 will simultaneously move pointer 44 relative to pointer 43 and rotate the sprocket 51. The handle 58 on the gear-box is provided for convenient rotation of the stylus about the spindle bearing.

III. ROUTER ASSEMBLY

The actual carving of the developed surface model is accomplished by the router assembly 6 attached to the opposite end of the beam 34 from the stylus assembly for movement in response to movement of the stylus assembly. This assembly is a power-driven cutter including an oscillator mechanism which will simultaneously move or reciprocate the cutting bit horizontally and vertically resulting in carving along an inclined surface which is the resultant of the horizontal and vertical movements as components. Variations in the inclination of the surface cut are accomplished by variations of the amplitude of the horizontal and vertical oscillations. The direction of each cut is controlled by the linking of the router assembly to the stylus assembly so that the router assembly will rotate about its axis responsive to movement of the stylus assembly about its axis. The router assembly 6 may, for the purpose of convenience in description, be considered in three sub-assemblies, namely, the suspension structure 60, the oscillator mechanism 70 and the cutter and cutter adjustment mechanism 130. The structure of each of these three sub-assemblies will be described in order.

IIIa. Router suspension assembly

The router assembly 6 is suspended from beam 34 by means of a router spindle 61 about which the entire router assembly rotates. The router spindle 61 is journalled in bearing 38 of beam 34 and extends perpendicular to beam 34 and parallel to the stylus spindle 40 of the stylus assembly. The router spindle 61 carries the retainer 62 locked thereon and bearing on the upper surface of beam 34 and the lower router sprocket 63 locked to the router spindle 61 and bearing against the under surface of the beam 34. The crank arm 64 is locked to the lower end of the router spindle just below the lower router sprocket 63. The router spindle shaft 65 is journalled in the router spindle 61 coaxially therewith and extending from slightly above retainer 62, where it is locked into the upper router sprocket 66, to a point spaced substantially below the crank arm 64. The lower end of the router spindle shaft 65 has a longitudinal slot 67 on which is keyed bevelled gear 68.

IIIb. Oscillator mechanism

The movement of the rotary drill cutting bit simultaneously horizontally and vertically to result in the carving along an inclined path is accomplished by the mechanism of the oscillator 70, best shown in Fig. 7. This oscillator mechanism 70 involves two separate units, one of which imparts a vertical reciprocation to the entire router assembly, the other of which imparts a horizontal reciprocation to the cutter, more fully described below, so connected to the common source of power that the two reciprocations reach their limits and reversing points simultaneously. This arrangement is to produce the ultimate result of the movement of the cutter along a path that is diagonal with respect to the two directions of oscillation and is the resultant of the two directional oscillations as components. The amplitude of movement of each oscillating or reciprocating mechanism is independently adjustable to permit variations in the amount of inclination of the resultant path of the rotary drill cutting bit.

The oscillator mechanism 70 includes an oscillator housing or gear-box 71 internally subdivided into a power transmitting chamber 72, a vertical oscillator chamber 80 and a horizontal oscillator chamber 100. The power transmitting chamber 72 contains a power shaft 74 extending therethrough and journalled in bearings in the walls of the chamber. The power shaft 74 at one end extends into the vertical oscillator chamber 80 and at the other end extends from the housing 71 for attachment to a suitable power supply such as the motor 150 shown in Fig. 1. The power transmitting chamber is provided with a bevelled gear 75 locked to the power shaft 74 for rotation therewith and a power take-off shaft 76 journalled in a bearing in the wall of chamber 72 that is common thereto and to the horizontal oscillator chamber 100. Bevelled gear 77 is locked on the end of shaft 76 inside the chamber 72 and is meshed with the bevelled gear 75.

Gears 75 and 77 are so meshed that each of cams 81 and 101, fully described below, reaches its point of maximum camming when the other reaches its point of minimum camming. This arrangement withdraws and extends the oscillating shafts 90 and 110, fully described below, alternately causing the tip of the rotary drill 135 to move at an angle to both the shafts 90 and 110 in a straight line that is the vector resultant of the movements of the shafts 90 and 110 as components. The arrangement disclosed provides for the movement of drill 135 upwards as it leaves its position of axial alignment with the spindle 61, as hereinafter explained, but it is within the contemplation of the disclosure that the movement could be downward if it were found to be advantageous to cut downward rather than upward.

The vertical oscillator chamber 80 shown in vertical central section in Fig. 7 encloses the mechanism to impart a vertically reciprocating motion to the entire oscillator. This mechanism is driven by a disc-shaped cam 81 having a circular cam race 82 milled from one circular face and being locked to that end of power shaft 74 extending into the vertical oscillator chamber 80. Rocker arm 83 extends across the face of cam 81 and is pivoted at one end on pivot pin 84, as best shown in Fig. 12, in which is shown a perspective of the rocker arm 83 and other structure about to be described. The pivot pin 84 extends into a wall of the vertical oscillator chamber. Rocker arm 83 carries roller 85 which is engaged in the milled raceway 82. The rocker arm 83 has longitudinal grooves 86 cut into the two opposite faces thereof adjoining the face which carries roller 85.

This arrangement permits the cam and rocker arm to convert the rotary motion of shaft 74 into the reciprocating angular motion of rocker arm 83.

Sliding block connector 87 is a rectangular block having a groove 88 cut into one face thereof leaving tongues 89 along parallel edges of that face. The groove 88 and tongues 89 are so cut that the block may be frictionally received on the rocker arm 83 with the tongues 89 riding in grooves 86. Connector 87 carries, protruding from one side, an extension 98 which is pierced by a threaded bore 99 extending therethrough parallel to the tongues 89. Roller 97 is attached to connector 87 on the face opposite from that carrying groove 88 so as to permit movement of the roller about its axis. The sliding block connector is retained on rocker arm 83 and propelled therealong by threaded shaft 96 which extends through the threaded bore 99 of the connector extension and is supported parallel to the rocker arm 83 by pillow blocks 95 extending from rocker arm 83.

The router assembly vertical oscillating shaft 90 is supported for longitudinal reciprocation in bearings 91 and extends through the vertical oscillating chamber perpendicular to the power shaft 74. The sliding cross 92 is parallel to the rocker arm 83 and normal to the vertical shaft 90, being secured to the latter by clamp 93. The side of sliding cross 92 facing rocker arm 83 is grooved at 94 to receive roller 97. The driving of the sliding cross 92 by the roller 97 riding in the groove 94 thereof converts the angular reciprocation of the roller 97 and the other parts connected thereto into a linear reciprocation in the sliding cross 92 and the vertical shaft 90.

The linear reciprocation of the router assembly vertical oscillating shaft 90 in and out of the vertical oscillator chamber effects a vertical reciprocation or oscillation of the entire oscillator 70 because the upper end of the vertical shaft 90 is locked in the crank arm 64 adjacent the end thereof remote from the router spindle 61. The amplitude of this vertical reciprocation or oscillation may be varied by operation of the thumb nut 69. Rotation of thumb nut 69 rotates threaded shaft 96, which, because it is threaded through the bore 99 will move the sliding block connector longitudinally along rocker arm 83 toward and away from pivot pin 84. Because the rocker arm is moving with an angular reciprocation about the pivot pin 84, the end of the rocker arm remote from the pivot pin moves through a greater distance than any other part of the rocker arm and that portion of the rocker arm adjacent pivot pin 84 moves very little. Therefore, the amount of movement that roller 97 can impart to the sliding cross 92 depends upon the distance that the roller is removed from the pivot pin 84. When roller 97 is directly over pivot pin 84 no movement whatsoever will be imparted to the sliding cross 92.

The horizontal oscillator chamber 100 of the oscillator houses the mechanism for imparting a horizontal oscillating movement to the cutter. This mechanism is substantially identical to the vertical oscillating mechanism described above and includes the disc-shaped cam 101 attached at one face to the power take-off shaft 76 and having a circular raceway 102 milled from the opposite face. Rocker arm 103 is attached to the housing by pivot pin 104 for angular motion thereabout and carries a roller 105 which runs in the raceway 102. This structure provides for the conversion of the rotational motion of the shaft 76 into the angular reciprocating motion of the rocker arm 103.

The angular reciprocating motion of rocker arm 103 is conveyed from the rocker arm by means of the sliding block connector 107 which is a rectilinear block identical to the sliding block connector 87 previously described, and shown in detail in Figs. 14 and 15, and having the groove 108 and the tongues 109 on one face thereof, which permit the sliding block connector to be retained on and slid along one face of the rocker arm. Sliding cross 112, which receives roller 117 in groove 114 in one face thereof, translates the angular reciprocating motion of roller 97 into a linear reciprocating motion because the sliding cross 112 is attached by means of clamp 113 to the router assembly horizontal oscillating shaft 110 which itself is limited to linear motion by its mountings in bearings 111. The amplitude of the oscillation or reciprocation of shaft 110 may be varied by moving the sliding block connector along the rocker arm increasing and decreasing its distance from the pivot pin 104. The connector 107 is propelled along the rocker arm 103 by means of the threaded shaft 116 which is journalled in pillow blocks 115 for rotation and which passes through the threaded bore 119 in extension 118 on the connector 107.

Movement is imparted to the threaded shaft 116 by means of universal linkage 129 which is locked both to the threaded shaft 116 and to shaft 128. Sprocket 127 is locked to shaft 128 for the receipt of mechanical movements from the control mechanism.

The cams 81 and 101 are disclosed as circular but may be made elliptical or heart shaped, as a matter of mechanical design, to impart a reciprocating motion of more uniform speed and of more nearly instantaneous acceleration on reversal of direction.

IIIc. *Cutter and cutter adjusting mechanism*

The cutter and cutter adjusting mechanism 130 is attached to an end of the router assembly horizontal oscillating shaft 110 by means of lock collar 131, holding the jib assembly 132 which receives the slide 133, best illustrated in Fig. 10, to which the cutter is attached. In the particular embodiment shown, the cutter consists of a motor 134 fitted with a rotary drill 135 of commercial or other design suitable to cut the particular material used in block blank 7. The drill 135 may be spherical or conical and may be of tool steel or abrasive or other cutting material. An alternative structure easily contemplated would be a rotary drill powered by a flexible cable attached to the same source of power as is the power shaft 74.

In the embodiment disclosed, the slide 133 carrying motor 134 is adjustably retained in the jib assembly 132 by means of the adjusting screw 136 which is journalled in flange 137 of slide 133 and retained therein by collar 138 and knob 139. The adjusting screw 136 is threaded through the nut 142 which is attached to the jib assembly 132 so that rotation of the screw 136 will result in vertical adjustment of the cutter unit of motor 134 and drill 135, relative to the horizontal oscillating shaft 110. Knob 139 is provided with a disc-shaped dial 140 which is calibrated to provide for adjustment of the cutter through predetermined distances.

The cutter and cutter adjusting mechanism and the distance of separation of the router assembly vertical oscillating shaft 90 and the router spindle 61 are so proportioned that the rotary drill 135 is coaxial with the router spindle shaft 65 when the horizontal oscillating shaft 110 is in the withdrawn position, as shown in Fig. 7. This arrangement is necessary so that the drill will maintain its relation to the pointers as the router and stylus assemblies are rotated about their respective axes.

The angle arm 120 extends from the housing 71 parallel to the router assembly horizontal oscillating shaft 110 and crank arm 64. The angle arm 120 is provided with an aperture receiving the router spindle shaft 65 at its keyed end and supports the bevelled gear 68 thereon. The angle arm 120 carries support 121 normal thereto and shaft 122 extending through the arm and the support. Bevelled gear 123 is locked to the shaft 122 for rotation therewith and is meshed with bevelled gear 68. The shaft 122 is also provided with sprocket wheel 124 locked thereon beyond support 121. Sprocket 124 is interconnected with sprocket 127 of the adjusting mechanism of the horizontal oscillator by means of chain 125 to transmit rotation of the router spindle shaft 65 to the threaded shaft 116 of the amplitude adjusting mechanism of the horizontal oscillator.

IV. CONTROL MECHANISM

The control mechanism generally indicated by the numeral 9 in Fig. 1 interconnects the router and stylus assemblies for control of the router and elements thereof responsive to conditions within the stylus assembly.

IVa. *Lower control mechanism*

Lower stylus sprocket 41 which is locked to the stylus spindle is interconnected with the lower router sprocket 63 by means of chain 141 to form an orientation or linkage control means so that rotation of the stylus about its axis will produce a corresponding rotation of the router about its axis to maintain the orientation of the router identical to that of the stylus. The machine is aligned so that the router assembly horizontal oscillating shaft 110 is parallel to the distance between pointers 43 and 44 as represented by the spacing screw 46 so that the chain 141 has the additional function of maintaining that parallel alignment when the stylus is rotated by the turning of handle 58. It is this parallel alignment that permits the rotary drill 135 to move between points on the block blank 7 which are oriented with respect to the block 7 as the pointers 43 and 44 are oriented with respect to the map 5 being traced.

Operation of the hand wheel 56 in the stylus assembly moves the pointer 44 toward or away from the pointer 43 by means of the gear-box sprocket 55, the chain 57, the spacing nut sprocket 49, and the spacing screw 46, and at the same time, by means of pinion 54 and the bevelled gear 52, rotates the stylus spindle shaft 50 to which is attached the upper stylus sprocket 51.

IVb. *Upper control mechanism*

The upper control chain 151 interconnects the upper stylus sprocket 51 and the upper router sprocket 66, which in turn drives the router spindle shaft 65, gears 68 and 123, shaft 122, sprocket 124, chain 125, and sprocket 127 to form an amplitude control or linkage means for the router assembly horizontal oscillating shaft. Movement of sprocket 127 propels the block connector 107 along the rocker arm 103 in response to movement of the hand wheel 56 of the stylus assembly, moving pointer 44 with respect to pointer 43. The various elements of this control mechanism are so designed with respect to their relative sizes that the amplitude of oscillation of the router assembly horizontal oscillating shaft 110 is maintained equal to the distance between pointers 43 and 44 at all times.

V. OPERATION

In order to cut a three dimensional model from information provided by a two dimensional pattern, as for example a contoured map, the map or other pattern, as 5, is oriented on the platform 3 between the rails 11 and under the stylus assembly. A block of the material, as 7, from which the three dimensional model is to be cut is oriented on the platform 3, also between the rails 11 and under the router assembly. The structure of the parallel motion mechanism including the two carriages, running on the two sets of rails normal to each other in response to operation of the hand wheels 8, moves the stylus and router assemblies simultaneously and in parallel directions so as to permit the stylus assembly to be moved to any point on the map with a simultaneous movement of the router assembly to the corresponding point on the block.

After the orientation of both the map and the model, the operation is continued by the selection of two contour lines on the map, the surface between which is to be reproduced in the developed surface of the model. The pointer 43 is placed on any point selected on that one of the two contour lines representing the lower elevation. This movement simultaneously places the rotary drill 135, when the horizontal oscillating shaft is in its withdrawn position, above a corresponding point on the block 7. The stylus assembly is then rotated about the stylus spindle, and about the axis of pointer 43, so that the pointers 43 and 44 indicate the shortest distance to the next higher contour from the point selected. Hand wheel 56 is then rotated to move the pointer 44 to the point on the next higher contour which is nearest to the point indicated by pointer 43. The rotation of the stylus assembly about the stylus spindle causes a like rotation of the router assembly about the router spindle, so that the router assembly horizontal oscillating shaft 110 will indicate the direction on the model between the point indicated by the rotary drill 135 and the point which is the equivalent of the point indicated by the pointer 44. The operation of the hand wheel 56 in setting the pointer 44 on a point of the next higher contour, will, through the control mechanism previously described, adjust the amplitude of movement of the horizontal oscillating mechanism by moving the sliding block connector 107 along the rocker arm 103. The thumb nut 69 of the vertical oscillating mechanism is then adjusted to cause the amplitude of movement of the vertical oscillating mechanism to be equivalent to the scale of the contour interval. With the oscillator set to oscillate vertically through a distance which is the scale of the contour interval and horizontally the linear map distance between the two points indicated by pointers 43 and 44 which are directly opposite on adjacent contour lines, the rotary drill 135 will move through the resultant of those two movements as components thereby cutting in the block 7 a line having the slope of the surface which the map represents. The knob 139 on the cutter adjusting mechanism is then rotated to lower the rotary drill 135 into the block 7 to the scale value of the contour line indicated by pointer 43. This movement will cause the rotary drill 135 to cut into the block to the scale elevation of that contour. The movement of the rotary drill 135 will then cut a linear portion of the surface to be developed.

The pointers 43 and 44 are then moved slowly along the two contour lines with each pointer 43 and 44 tracing its respective contour line. This movement will entail two operations—one being the rotation of the stylus assembly on its spindle to orient the line determined by pointers 43 and 44 to indicate the shortest distance between the two contour lines at each point along the contour traced by pointer 43, the other being the operation of the hand wheel 56 to change the distance between pointers 43 and 44 so that those pointers accurately trace the contour lines sensing the direction and distance therebetween. This tracing will effect a corresponding movement of the router assembly about the router spindle and constant adjustments of the amplitude of movement of the horizontal oscillation so that an undulous plane is developed which will be a scale replica of the terrain represented by the two contours traced.

After completion of the developed surface between the two contour lines originally selected, the operation is continued by movement of the pointer 43 accompanied by a corresponding movement of the rotary drill 135 to a new contour line where the operation described above is repeated until the surface between this second selected contour line and the one next adjacent is developed in its entirety. The process is continued until each contour line has been traced by each pointer so that the surface between each pair of contour lines has been reproduced. In the selection of a new contour line, it is necessary to adjust the knob 139 of the cutter adjusting mechanism to set the rotary drill 135 to a new contour level, but it is not necessary to further adjust thumb nut 69 of the vertical oscillating mechanism because the contour interval will remain the same.

VI. THE METHOD OF CUTTING A THREE-DIMENSIONAL MODEL FROM A TWO-DIMENSIONAL PATTERN

The method of cutting a developed surface terrain model or other solid replica from a contoured map or other planar pattern, that is or may be contoured, of which the operation of the above-disclosed machine is one specific embodiment, is broadly one of orientation and projection from a determined point similar to systems of polar coordinates. This method contemplates the selection of a point within the block from which the model is to be carved as an initial point on the ultimate developed surface of the model and representing a particular point on the map or other pattern and the subsequent carving from that selected point in the block, as a point of origin, a portion of the developed surface of the model as determined from data relative to the particular point on the map or other pattern and the subsequent repetition of the process for adjacent points.

One system incorporating this method includes for convenience the orientation of the blank from which the model will be carved with the pattern, which orientation facilitates the selection of the initial point in the blank so that the blank will receive the model readily. A point on the pattern is then selected and its corresponding point within the blank is selected or determined. The selection or determination of the corresponding point within the block incurs, first, the location of the point in a plane in or on the block parallel to the plane of the pattern as convenience dictates or in reference to the edges of both block and pattern; second, the location of the point in a plane normal to the block or pattern which entails the selection of that plane parallel to the map or pattern that will represent the loci of all points having the same elevation above the bottom surface of the block as prescribed by the pattern; and, third, the projection of the point first determined to the plane determined in the second step. In the case of terrain models made from contoured maps this determination is most easily made by selecting the initial point on the map on a contour line. Determination is next made on the map of the direction and distance to the nearest point on the next contour line or loci of points at another known elevation from a base plane in either direction. It is also necessary that the contour interval or the difference between elevations of the loci of points used be known. With this information a cut is made in the block blank beginning from the original point selected as an origin. The cut is made in the same direction as the line on the map between the original point and the second point thereon, in other words, the line along which the cut is made lies in a plane that is both parallel to the line between the two points on the map and at the same time is normal to the plane of that map. Within this determined plane the line to be cut will run at an angle to the plane of the map that may be determined by the use of the map distance between those two points as a horizontal component and the contour interval, previously mentioned, as a vertical component from which the inclination and extent of the resultant of those two components may be determined by construction in a right triangle. This inclination of the line to be cut may be expressed alternatively as inclining at an angle to the plane of the pattern, which angle has as its tangent the ratio of the model scale of the contour interval to the distance between the originally selected point on a contour of the map and the point determined to be the nearest point thereto on a next adjacent contour.

The process is then continued with adjoining points having the same elevation or distance above a base plane as the point originally selected, with the result that a surface is generated by the successive lines running between the two planes which are the loci of points of given distances or elevations above a predetermined plane. After completion of the developed surface between any two successive contour lines or loci of points of determined distance from, or elevation above a base plane, the operation is continued between other adjacent successive loci, or contour lines, in the instance of a contour map, until each contour line has been used to furnish both an originally selected point and a point closest thereto on a next adjacent contour line. Upon completion of the carving between each two loci or contour lines, a completely developed surface will result.

Although the developed surface will have been generated by a multiplicity of straight line cuts and therefore not be an absolute replica of the original to be duplicated and some minute polishing or filling might be desirable, it is contemplated that the distances between loci, or contour intervals in the case of a map, to be used will be such that only minute fluctuations in the surface to be reproduced will be omitted. It is obvious that the accuracy of the reproduction increases as the contour interval decreases.

Having thus described our invention, what we claim as new and wish to secure by Letters Patent is:

1. A pattern controlled milling machine comprising a parallel motion mechanism; a multiple stylus means depending from said mechanism; a routing means depending from the said mechanism and spaced from the said stylus means, said routing means including a cutting element and means for reciprocally moving the cutting element simultaneously both horizontally and vertically; and means operably interconnecting said stylus means and said routing means for adjusting the direction and amplitude of the reciprocation of the cutting element in response to the direction and distance between parts of the multiple stylus means.

2. A pattern controlled milling machine comprising a plurality of relatively movable cross members arranged for relative motion normal to each other to provide a parallel motion carriage, stylus means including adjustably spaced twin pointers for simultaneously tracing on a planar pattern the loci to two points each representing a different elevation or distance above a base plane and for indicating the direction between corresponding points of the two loci, router means including a cutting element for cutting a model, driving means therefor comprising a vertical drive and a horizontal drive, means supporting said stylus means and said router driving means on different ends of one of said cross members respectively, and means operably interconnecting said router driving means and said twin pointers for translating the direction and spacing between the twin pointers into vertical and horizontal routing motions corresponding to said direction and spacing.

3. The structure of claim 2 wherein the means supporting the stylus means and the router means include a stylus spindle and a router spindle journalled in one of said cross members in parallel spaced relationship, said spindles being coaxial with one of the spaced twin pointers and said cutting element respectively, and wherein the stylus means includes means for moving the other of said spaced twin pointers towards and away from the pointer disposed in coaxial relation with said spindle.

4. The structure of claim 3 wherein the means operably interconnecting the router driving means and the twin pointers include means to rotate the router means about the router spindle responsively to movement of the stylus means about the stylus spindle whereby the direction of the horizontal drive is parallel to the direction between said spaced twin pointers, and means for adjusting the amplitude of said horizontal drive to be exactly equal to the distance between said spaced twin pointers.

5. A developed surface terrain model cutting machine comprising an elongated platform; spaced parallel longitudinal rails extending the length of the platform; a first carriage movably mounted on said rails; spaced parallel lateral rails supported on the first carriage and normal to said longitudinal rails and in a plane parallel thereto; a second carriage movably mounted on said lateral rails; screw means for propelling the first carriage along said parallel longitudinal rails; shaft and screw means for propelling the second carriage along said lateral rails; a beam attached to the second carriage parallel to the longitudinal rails; stylus means and router means attached to said beam at opposite ends thereof; said stylus means including a stylus spindle normal to said beam, a first pointer secured to said stylus spindle coaxially therewith and substantially in extension thereof, a second pointer parallel to the first pointer and adjustably secured thereto; said router means including a router spindle journalled in said beam parallel to the stylus spindle, a crank arm attached to the router spindle for rotation therewith, a vertical router oscillating shaft attached to said crank arm parallel to the router spindle, a power driven oscillator attached to said vertical oscillating shaft for movement therealong, said oscillator including a horizontal router oscillating shaft normal to said vertical router oscillating shaft, means for reciprocally moving the oscillator along the vertical router oscillating shaft, and means for reciprocally actuating said horizontal router oscillating shaft in a plane normal to that of said vertical router oscillating shaft, and a rotary drill affixed to one end of the horizontal router oscillating shaft with its longitudinal axis normal to said horizontal router oscillating shaft; control means for varying the amplitude of oscillation of the vertical router oscillating shaft; and additional control means responsive to said stylus means coupling said stylus means and said router means; the additional control means including orientation control means for rotating the router means about the router spindle to maintain said horizontal router oscillating shaft parallel to the line determined by the two pointers of the stylus means and amplitude control means for adjustably varying the amplitude of the oscillation of the horizontal router oscillating shaft responsive to and equal to the distance between the two pointers of the stylus means and for simultaneously adjustably spacing the two pointers.

6. A developed surface terrain model cutting machine comprising a platform; a beam; means supporting said beam in spaced parallelism with said platform; means for moving said beam longitudinally and transversely of the beam and in a plane parallel to said platform; stylus means including adjustably spaced twin pointers, a stylus spindle aligned with one of said pointers depending from one end of said beam toward said platform and having the stylus spindle journalled in said beam normal to the platform; router means including a router spindle journalled into the other end of said beam normal to the platform and depending from said beam; said router including a rotary drill in extension of said router spindle and means interconnecting said router spindle and said rotary drill for oscillating the rotary drill axially toward and away from said router spindle and simultaneously in and out of alignment with said router spindle; and control means including means for rotating the router spindle in response to rotation of the stylus spindle, means for adjustably spacing said twin pointers and for varying the amplitude of the oscillation of the rotary drill into and out of alignment with said router spindle, and means for varying the amplitude of the axial oscillation of the rotary drill towards and away from said router spindle.

7. A developed surface terrain model cutting machine comprising in combination a platform, a beam, means for supporting said beam in space parallel to said platform and for moving said beam through a plurality of parallel positions in a plane parallel to said platform, compound stylus means supported by the beam adjacent one end thereof for rotation about its axis and extending normal thereto towards said platform, router means supported by said beam adjacent the other end thereof for rotation about its axis which is parallel to the axis of the stylus means and extending normal thereto towards the said platform, and control means coupling the compound stylus means and the router means for controlling the router means responsive to conditions within the stylus means; said compound stylus means including a stylus spindle coincident with its axis of rotation journalled at one end in the beam, twin pointers attached to the other end of the stylus spindle, one of said pointers being coincident with the axis of rotation of said stylus means and substantially in prolongation of the stylus spindle, the other of said pointers being supported in adjustable parallel spaced relation from said one pointer, means for moving the other pointer towards and away from said one pointer; the router means including a router spindle coincident with its axis of rotation journalled at one end in the beam, a crank arm locked to the other end of the router spindle and extending normal thereto, a vertical router oscillating shaft locked to the crank arm parallel to and spaced from the router spindle, a power driven oscillator attached to the vertical router oscillating shaft for movement therealong and including a horizontal router oscillating shaft extending normal to the vertical oscillating shaft, means for reciprocally moving the oscillator to and fro along the vertical oscillating shaft to oscillate the oscillator towards and away from the platform, adjusting means to vary the amplitude of the oscillation of the oscillator along the vertical oscillating shaft, and amplitude adjustable means for reciprocally moving the horizontal oscillating shaft in and out of the oscillator, a cutter adjustably affixed to one end of the horizontal oscillating shaft exteriorly of the oscillator and coincident with the axis of rotation of the router means when the horizontal oscillating shaft is at the extreme of its movement into the oscillator, and means to move the cutter relative to the horizontal oscillating shaft along the axis of rotation of the router means; the control means coupling the stylus means and the router means including an orientation linkage means for rotating the router means about its axis of rotation in response to and equal to rotation of the stylus means about its axis of rotation and an amplitude linkage means responsive to movements of said one pointer of the stylus means with respect to said other pointer for maintaining the amplitude of the oscillation of the horizontal oscillating shaft of the oscillator equal to the distance between the two pointers.

8. A router for a pattern controlled milling machine comprising a spindle and a rotary drill in spaced axial alignment, a gear-box interconnecting said spindle and said rotary drill, said gear-box including means for oscillating said rotary drill along its axis away from and toward said spindle, and means for oscillating said rotary drill out of and back into the said axial alignment and means for varying the amplitude of each oscillation.

9. A router for a pattern controlled milling machine comprising a spindle about which the unit will rotate when the spindle is journalled in a supporting means, a crank arm normal to said spindle and locked thereon, a first oscillating shaft locked in said crank arm parallel to said spindle, a second oscillating shaft spaced from and normal to the first oscillating shaft, a rotary drill normal to said second oscillating shaft and connected to the end thereof by drill driving means, said rotary drill being axially aligned with said spindle but spaced therefrom, a gearbox interconnecting the two oscillating shafts and in which said shafts are journalled, oscillating means in the gear-box for simultaneously oscillating the oscillating shafts, driving means for the oscillating means, and means for varying the amplitude of oscillation of each oscilating shaft.

10. The structure of claim 9 wherein the means for oscillating each oscillating shaft includes a cam driven by the driving means, a pivoted rocker arm driven by each cam, a cross fixed to each oscillating shaft and lying in a plane contiguous to and parallel to the plane of the respective rocker arm, connecting means for connecting each said cross and each said rocker arm at any distance from the pivot of the rocker arm; and wherein each said means for varying the amplitude of the oscillation of each oscillating shaft includes a means for moving the connecting means toward and away from the pivot point of the rocker arm; and wherein the rotary drill driving means is connected to the end of the second oscillating shaft by means of screw means for moving the rotary drill along its axis.

11. A stylus for a pattern controlled milling machine of the type disclosed comprising a spindle, a first pointer connected to the said spindle in axial alignment with and in extension thereof, and a second pointer parallel to the said first pointer and connected thereto by means for adjustably spacing the said second pointer from the said first pointer.

12. A stylus for a pattern controlled milling machine of the type disclosed comprising a spindle having a sprocket wheel locked thereon; a first shaft extending axially through said spindle; a second sprocket wheel locked on the shaft at one end of said spindle; a gear-box affixed to said spindle at the other end thereof; a first pointer affixed to said gear-box in extension of said spindle and coaxial therewith; a second pointer parallel to said first pointer and affixed thereto by screw means for adjustably spacing the two pointers; and operating means including a first gear within said gear-box keyed to said first shaft on the opposite end thereof from the second sprocket wheel, a second shaft journalled in the gear-box, a second gear meshed with said first gear and locked on said second shaft, a third sprocket wheel locked on said second shaft externally of said gear-box, a fourth sprocket wheel locked on said screw means, and a chain interconnecting the third and fourth sprocket wheels whereby the two said pointers may be adjustably spaced by the said operating means, whereby the spacing of the said two pointers may be transmitted to mechanisms remote from the said stylus by the said second sprocket wheel, and whereby rotation of the stylus about the axis of said spindle may be transmitted to mechanisms remote from said stylus by said first sprocket wheel.

13. In a pattern controlled milling machine for cutting a three-dimensional model from a contoured planar pattern, said machine having a parallel motion carriage on which is journalled a stylus means and a router means in spaced relation, said stylus means including twin pointers and means for adjustably spacing said twin pointers, and said router means including a rotary drill normally coaxial with the journalled connection and including means interposed between said journalled connection and said rotary drill for oscillating the cutting edge of the drill both parallel to and normal to said planar pattern, the combination of means interconnecting the stylus means and the router means for rotating the router means about its journalled connection with the carriage responsive to and equal to rotation of the stylus means about its journalled connection with the carriage.

14. In a pattern controlled milling machine for cutting a three-dimensional model from a contoured planar pattern, the said machine having a parallel motion carriage supporting a stylus means and a router means in spaced relation thereon, said stylus means having twin adjustably spaced pointers for simultaneously tracing successive contours of the pattern and said router means having means for oscillating the cutting portion thereof both parallel to and normal to the said contoured planar pattern, the combination of means responsive to the stylus means for orienting the oscillation of the router means parallel to the planar pattern parallel to a line determined by the twin pointers, means responsive to the stylus means for adjusting the amplitude of the oscillation of the cutting portion of router means parallel to the contoured pattern to equal the distance between the two pointers, and means for adjusting the amplitude of the oscillation of the cutting portion of the router means normal to the contoured planar pattern.

15. A machine for cutting a developed surface model from a solid block using information traced from a horizontal contoured planar pattern comprising, in combination, means for indicating a selected point on a selected contour line of a pattern, means for locating a point in a solid block corresponding to the selected point indicated on the pattern, means for locating a second point on the pattern on a next adjacent contour line and nearest thereon to the first selected point, means for establishing a direction from the point located within the block corresponding to the direction from the first point selected to the second point on the pattern, means for cutting along the direction established from the point within the block for a distance equal to the actual slope distance represented by the pattern distance between the two points on the pattern, and means to move the aforesaid means to permit repetition of operation from any selected point on the pattern.

16. A machine for cutting a developed surface terrain model from a solid block using information traced from a horizontal contoured planar map as a pattern comprising, in combination, means for locating within a block from which a model is to be cut a point corresponding to a selected point on a selected contour line of the map, means for establishing the line having the shortest distance from the selected point on the map to a next adjacent contour line, means for locating and indicating a second point on the map at the intersection of the line of the shortest distance established and the next adjacent contour line to which that distance extends, means for establishing a vertical plane through the said point within the block and parallel to the said shortest distance line, means for establishing a vertical angle in the vertical plane established with the vertex at the said point within the block having a tangent equal to the ratio of the model scale of the contour interval to the map distance between the two said points on the map, means to establish a distance along the said vertical angle from the point within the block equal to the scale of the actual slope distance represented by the map distance between the two said points on the map, means to cut along the said distance established along the vertical angle, and means to move the aforesaid means relative to the map and block to permit operation from any point on the map that may be selected.

17. The method of cutting a developed surface model from a horizontal contoured planar pattern by locating within the block from which the model is to be cut a point corresponding to a selected point on a selected contour line of the pattern, locating a second point on the pattern nearest the first selected point and on a next adjacent contour line, establishing a direction from the point located within the block corresponding to the direction from the selected point to the said second point on the pattern, cutting along the direction established from the said point located within the block for a distance equal to the scale of the actual slope distance represented by the pattern distance between the said selected point and the said second point, and repeating the operation with successive selected points on each contour line of the pattern.

18. The method of cutting a developed surface model from a contoured horizontal planar pattern by locating within the block from which the model is to be cut a point corresponding to a selected point on a selected contour line of the pattern, locating a second point on the pattern nearest the first selected point and on a next adjacent contour line, establishing a direction from the point located within the block corresponding to the direction from the selected point to the said second point on the pattern, establishing a distance along the direction established from the point located within the block equal to the scale of the actual slope distance represented by the pattern distance between the said selected point and the said second point, cutting along the said distance established from the said point in the block, and repeating the operation with successive selected points on each contour line of the pattern.

19. The method of cutting a developed surface terrain model from a contoured horizontal planar map as a pattern by locating within the block from which the model is to be cut a point corresponding to a selected point on a selected contour line of the map, locating a second point on the map nearest the first selected point and on a next adjacent contour line, establishing a vertical plane through the said point in the block parallel to the line determined by the said selected point and the said second point on the map, establishing a vertical angle in the said vertical plane the tangent of which is equal to the ratio of the model scale of the contour interval to the map distance between the said selected point and the said second point on the map, establishing a distance along said vertical angle from the said point within the block equal to the scale of the actual slope distance represented by the map distance between the said selected point and the said second point, cutting along the said distance established, and continuing the operation with successive points on the map.

20. The method of cutting a developed surface terrain model from a contoured horizontal planar map as a pattern by locating within the block from which the model is to be cut a point corresponding to a selected point on a selected contour line of the map, establishing the line having the shortest distance from the said selected point on the map to a next adjacent contour line, locating a second point on the map at the intersection of the line of the shortest distance and the next adjacent contour line, establishing a direction from the point located within the block corresponding to the direction from the selected point to the said second point on the map, cutting along the direction established from the said point located within the block for a distance equal to the scale of the actual slope distance represented by the map distance between the said selected point and the said second point, and repeating the operation with successive selected points on each contour line of the map.

21. The method of cutting a developed surface terrain model from a contoured horizontal planar map as a pattern by locating within the block from which the model is to be cut a point corresponding to a selected point on a selected contour line of the map, establishing the line having the shortest distance from the said selected point on the map to a next adjacent contour line, locating a second point on the map at the intersection of the line of the shortest distance and the said next adjacent contour line, establishing a vertical plane through the said point in the block parallel to the line determined by the said selected point and the said second point on the map, establishing a vertical angle in the said vertical plane the tangent of which is equal to the ratio of the model scale of the contour interval to the map distance between the said selected point and the said second point on the map, establishing a distance along said vertical angle from the said point within the block equal to the scale of the actual slope distance represented by the map distance between the said selected point and the said second point, cutting along the said distance established, and repeating the operation with successive selected points on each contour line of the map to produce a surface.

22. Apparatus for cutting a three-dimensional replica from a contoured surface comprising, a sensing means, a cutting means spaced from and connected to the sensing means for equal parallel motion therewith, means for moving the cutting means, and means for setting a predetermined $y$-component on the means for moving the cutting means, said sensing means including means for sensing a variable $x$-component, said means for moving the cutting means including means responsive to said means for sensing a variable $x$-component for causing said cutting means to reproduce a resultant course of said $x$- and $y$-components, whereby operation of the machine controlled by changes in the $x$-component will cause changes in slope to form a three-dimensional replica of the contoured surface.

23. A differential cutting device comprising cutting means, means for adjusting said cutting means for a predetermined $y$-function, means for adjusting said cutting means for a variable $x$-function, means for moving said cutting means along a course that is the resultant of functions $x$ and $y$, whereby successive adjacent cuts of said cutting means will develop a surface of undulating nature as determined by variations in the $x$-function.

References Cited in the file of this patent

UNITED STATES PATENTS

| | | |
|---|---|---|
| 1,059,329 | Bucknam | Apr. 15, 1913 |
| 1,443,624 | Heise | Jan. 30, 1923 |
| 1,615,261 | Edmunds | Jan. 25, 1927 |
| 1,907,250 | Shaver | May 2, 1933 |
| 2,069,647 | De la Tour | Feb. 2, 1937 |
| 2,350,796 | Morioka | June 6, 1944 |
| 2,386,816 | Scholz | Oct. 16, 1945 |
| 2,472,273 | Bates | June 7, 1949 |
| 2,488,088 | Marchant et al. | Nov. 15, 1949 |